US008856062B2

(12) United States Patent
Su et al.

(10) Patent No.: US 8,856,062 B2
(45) Date of Patent: Oct. 7, 2014

(54) RULE CREATION AND APPLICATION

(75) Inventors: Yankai Su, Irving, TX (US);
Mohammad Farrukh Pulak, Richardson, TX (US); Sayeed Mahmud, Carrolton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 13/299,553

(22) Filed: Nov. 18, 2011

(65) Prior Publication Data
US 2013/0132332 A1    May 23, 2013

(51) Int. Cl.
*G06N 5/04* (2006.01)
*G06Q 30/00* (2012.01)
*G06N 5/02* (2006.01)

(52) U.S. Cl.
CPC . *G06N 5/02* (2013.01); *G06Q 30/00* (2013.01)
USPC .......................................................... 706/55

(58) Field of Classification Search
USPC ...................................................... 706/4, 11
See application file for complete search history.

(56) References Cited

U.S. PATENT DOCUMENTS

2007/0027674 A1\*   2/2007   Parson et al. ..................... 704/9

\* cited by examiner

*Primary Examiner* — Jeffrey A Gaffin
*Assistant Examiner* — Ola Olude Afolabi

(57) ABSTRACT

A computing device receives a rule that includes information describing conditions associated with a consequence, and identifies rule components corresponding to the rule. The computing device creates a rule formula, based on the rule components, by creating a first-order logic version of the rule and creating a rule formula table based on the first-order logic version of the rule. The computing device stores the rule formula table in a relational database.

20 Claims, 10 Drawing Sheets

RULE: A customer is qualified for offer A0001 if:

1) the customer is a California customer, has FTTP voice service, and total voice line count is at least two;

OR 2) the customer is a New York customer, has FTTP voice service, and has FiOS data service.

| Constants:<br>A0001: This is an offer code<br>CA: California<br>NY: New York | Functions:<br>state(x): The state of customer x<br>vlinencnt(x): The total voice line count of customer x |
|---|---|
| Variables:<br>x: Represents a customer<br>w: Represents an offer | Predicates:<br>FTTP(x): Customer x has FTTP voice service<br>FDATA(x): Customer x has FIOS data service<br>QUALIFY(x,w): Customer x is qualified for offer w |

| QUALIFY | STATE | FTTP | FDATA | VLINECNT | IS_ACTIVE |
|---|---|---|---|---|---|
| A0001 | CA | Y | NULL | 2 | Y |
| A0001 | NY | Y | Y | NULL | Y |
| A0002 | CA | N | Y | 2 | N |
| A0003 | NY | N | NULL | NULL | N |
| ... | ... | ... | ... | ... | ... |

920

| ATTRIBUTE_ID | FUNCTION_ID | OTHER ATTRIBUTES |
|---|---|---|
| QUALIFY | QUALIFY(x,w) | ... |
| FTTP | FTTP(x) | ... |
| FDATA | FDATA(x) | ... |
| VLINECNT | VLINECNT(x) | ... |
| ... | ... | ... |

930

| OFFER_ID | OFFER_NAME | DESCRIPTION | PRODUCT_ID | START | END |
|---|---|---|---|---|---|
| 1 | A0001 | FOR FIOS CUSTOMER | A0001 | 12/1/2010 | 12/1/2012 |
| 2 | A0002 | FOR LEC CUSTOMER | A0002 | 12/1/2010 | 12/1/2012 |
| ... | ... | ... | ... | ... | ... |

RULE CREATION AND APPLICATION

BACKGROUND

Companies and other types of organizations often implement strategies for offering goods and services to current and potential customers. For example, when a customer seeks to cancel services received from a communication service provider (e.g., an Internet service provider, a telecommunications service provider, etc.) the communication service provider may attempt to retain the customer by offering the customer a special deal or offer (e.g., enhanced services, reduced prices, etc.).

Prior to providing offers to the customer, however, the communication service provider must often determine which offers the customer qualifies for. Making such a determination often involves determining whether the customer satisfies a set of rules or conditions corresponding to each offer. However, currently available solutions for determining whether a customer satisfies a set of rules or conditions are inadequate. For example, many solutions for making such determinations require significant time, labor, and/or computing resources.

BRIEF DESCRIPTION OF THE DRAWINGS

FIG. 6A-6C are diagrams of example data structures according to an implementation described herein;

FIG. 9 is a diagram of example data structures according to an implementation described herein.

DETAILED DESCRIPTION OF PREFERRED EMBODIMENTS

The following detailed description refers to the accompanying drawings. The same labels and/or reference numbers in different drawings may identify the same or similar elements.

In one or more implementations, described herein, devices may be used to create a rule and apply the rule to a given scenario in an efficient, scalable, and adaptable manner.

Figure 1:
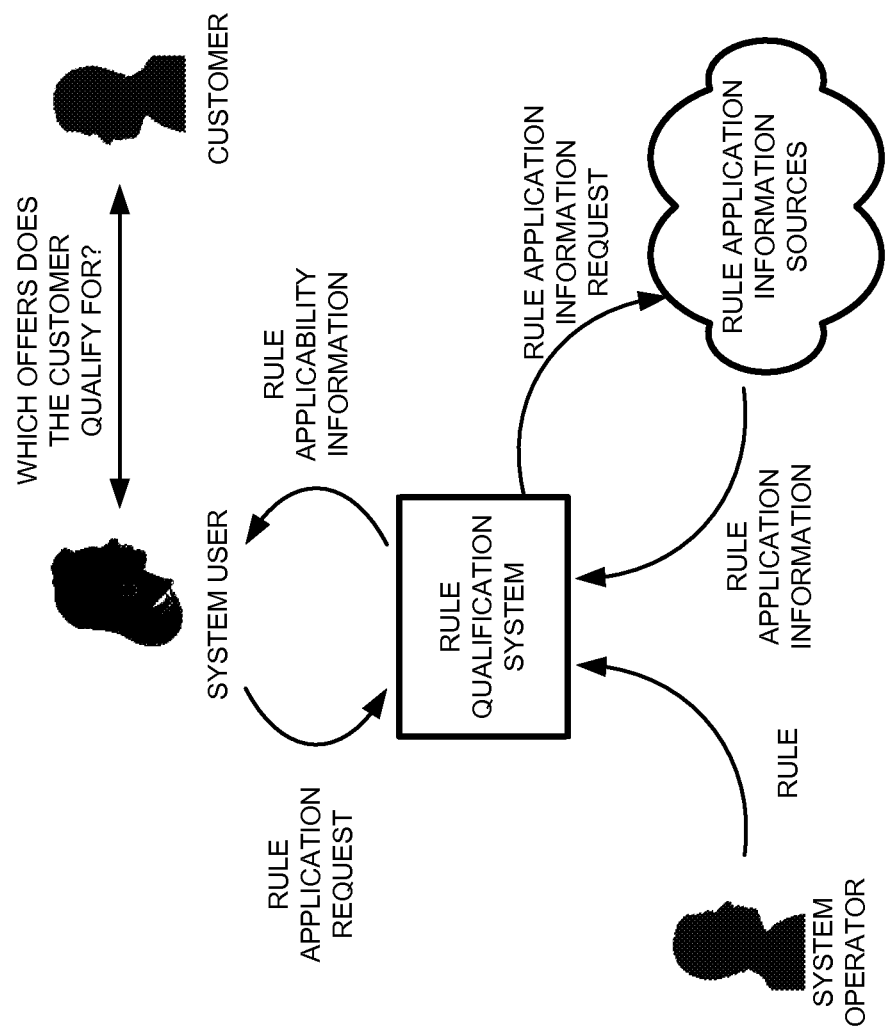
FIG. 1 is a diagram of an example overview of an implementation described herein.

FIG. 1 is a diagram of an example overview of an implementation described herein. As depicted in FIG. 1, a system operator may provide a rule to a rule qualification system. The rule may include a status portion and a conditions portion. In one example, the status portion may include information associated with a product or a service, and the conditions portion may include requirements or prerequisites to qualify for the product or the service. For instance, the rule may state that if a customer is from New York and is currently subscribed to telephone services, then the customer qualifies for a 10% discount on all communication services.

In the example overview of FIG. 1, a customer may contact a system user (e.g., a call center agent) to determine for which offers, if any, the customer qualifies. In response to the inquiry from the customer, the system user may communicate a rule qualification request to the rule qualification system. The rule qualification system may access one or more rules previously received from the system operator and one or more types of additional information (e.g., rule application information) in order to determine which rules the customer satisfies (e.g., which offers are available to the customer). The rule qualification system may communicate the available offers to the system user, and the system user may provide the available offers to the customer.

In some implementations, the rule qualification system may convert the rule received from the system operator into a rule formula (e.g., a distilled, first-order logic version of the rule). The rule qualification system may store the rule formula as a particular type of data structure, such as a table or another type of data structure corresponding to a relational database. The rule qualification system may associate the rule formula with other types of information to enable the rule qualification system to efficiently retrieve relevant information, organize the relevant information in a manner that is complementary to the rule formula, determine whether the relevant information satisfies the rule corresponding to the rule formula, and notify the system user accordingly.

Distilling a rule into a formula may enable the rule qualification system to operate with a relatively high degree of efficiency with respect to determining whether a set of information satisfies the rule. Additionally, or alternatively, expressing a rule as a record in a database table may enable the rule to be readily modified, added to, disabled, etc. In addition, since the rules may be expressed using first-order logic, relational database tables, etc., the processes and operations of the rule qualification system may be capable of scaling with considerable ease.

Figure 2:
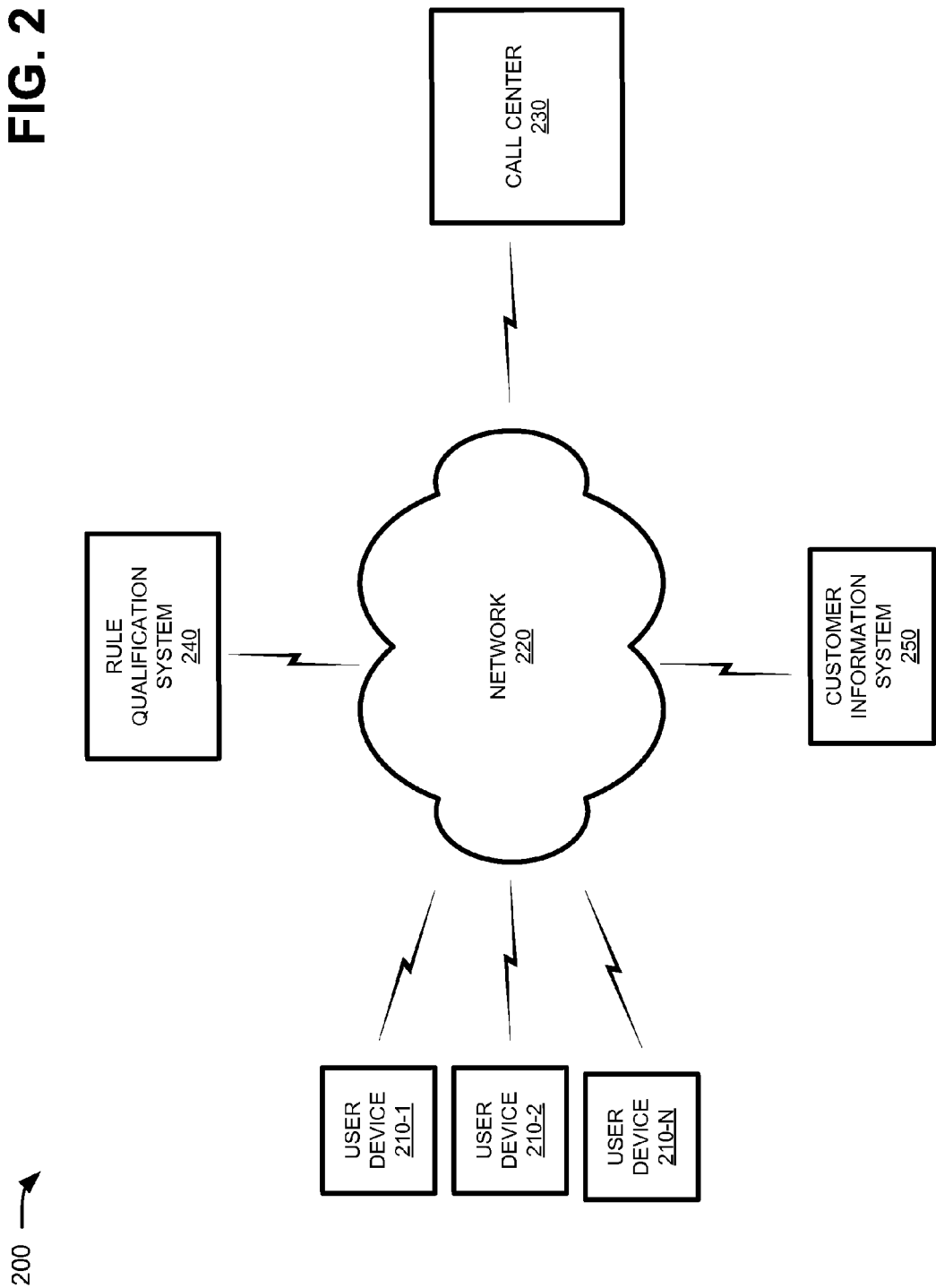
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include user devices 210-1, 210-2, ..., 210-N (where N≥1) (hereinafter referred to collectively as "user devices 210," and individually as "user device 210"), a network 220, a call center 230, a rule qualification system 240, and a customer information system 250.

The number of devices and/or networks, illustrated in FIG. 2, is provided for explanatory purposes only. In practice, there may be additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another of the devices of environment 200. Further, the devices and/or networks of environment 200 may interconnect via wired connections, wireless connections, or a combination of wired and wireless connections.

User device 210 may include any computation or communication device. For example, user device 210 may include a smart phone, a laptop computer, a tablet computer, a desktop computer, or one or more other types of computing or communication devices. User device 210 may send traffic to and/or receive traffic from network 220.

Network 220 may include one or more types of networks or combinations of networks. For example, network 220 may include a local area network (LAN) (e.g., an Ethernet network), a wireless LAN (WLAN) (e.g., an IEEE 802.11 network), a wide area network (WAN) (e.g., the Internet), or a wireless WAN (WWAN) (e.g., a Long-Term Evolution (LTE) network, a High-Speed Packet Access (HSPA) network, an Evolved High Rate Packet Data (eHRPD) network, etc). Network 220 may also, or alternatively, include an Internet Protocol (IP) Multimedia Subsystem (IMS) network, a fiber optic (e.g., a fiber optic service (FiOS)) network, a Voice over IP (VoIP) network, a metropolitan area network (MAN), an ad hoc network, or a telephone network (e.g., a Public Switched Telephone Network (PSTN)).

Call center 230 may include a centralized office or another type of site capable of calling or otherwise contacting user device 210. Call center 230 may include various networks and/or devices that are operated by call center agents, such as the system user discussed above with reference to FIG. 1. Examples of such networks and/or devices may include a server, a cluster of servers, a telephone, a wireless telephone, a router, a hub, a LAN, a wireless network, a virtual network, or one or more other types of networks or devices. For instance, call center 230 may include computers, telephones, and other devices, which may be used by call center agents to receive and service calls from customers or other individuals.

Rule qualification system 240 may include one or more of a variety of computation and/or communication devices. For example, rule qualification system 240 may include a computer, a server, a cluster of servers, or one or more other types of computation and/or communication devices. In some implementations, rule qualification system 240 may communicate with a network or device of call center 230 and/or customer information system 250.

For example, rule qualification system 240 may receive a request from an agent of call center 230. The request may include instructions for determining whether an individual corresponding to user device 210 qualifies for any available offers, deals, or promotions. Rule qualification system 240 may use a customer identifier included in the request to communicate with customer information system 250 and obtain additional information regarding the individual (e.g., customer profile information, customer account information, etc.). Rule qualification system 240 may apply a set of rules corresponding to currently available offers to determine whether the individual does, in fact, qualify for any of the offers. Rule qualification system 240 may notify call center 230 of the offers for which the individual qualifies.

Customer information system 250 may include one or more of a variety of computation and/or communication devices. For instance, customer information system 250 may include a desktop computer, a server, a cluster of servers, or one or more other types of computation and/or communication devices. Customer information system 250 may store one or more types of customer information (e.g., street addresses, e-mail addresses, telephone numbers, account identification information, etc.). As mentioned above, customer information system 250 may provide one or more types of customer information to rule qualification system 240 to enable rule qualification system 240 to, for example, determine whether a particular customer qualifies for an offer.

Figure 3:
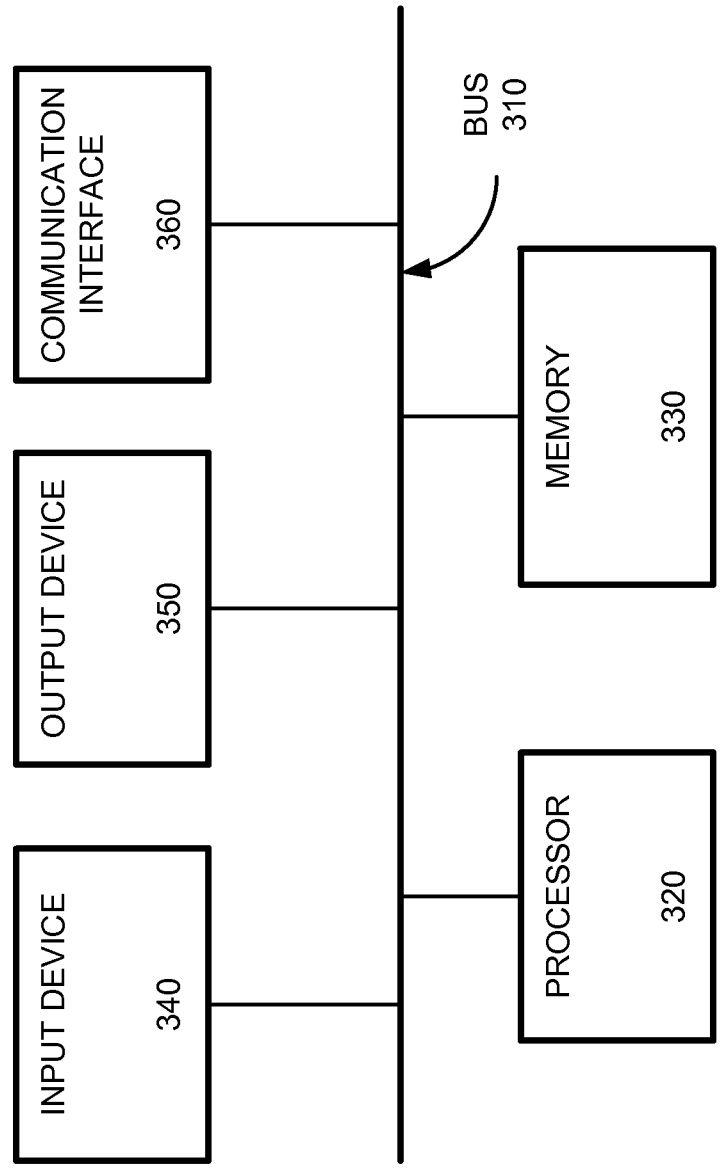
FIG. 3 is a diagram of example components of one or more devices of FIG. 2.

FIG. 3 is a diagram of example components of a device 300 that may correspond to one or more devices of environment 200 (FIG. 2). For example, device 300 may correspond to user device 210, rule qualification system 240, and/or customer information system 250. Each of user device 210, rule qualification system 240, and/or customer information system 250 may include one or more devices 300 and/or one or more of the components of device 300.

As depicted, device 300 may include a bus 310, a processor 320, memory 330, an input device 340, an output device 350, and a communication interface 360. However, the precise components of device 300 may vary between implementations. For example, depending on the implementation, device 300 may include fewer components, additional components, different components, or differently arranged components than those illustrated in FIG. 3.

Bus 310 may permit communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processor 320 may control the overall operation, or a portion thereof, of device 300, based on, for example, an operating system (not illustrated in FIG. 3) and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 360 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
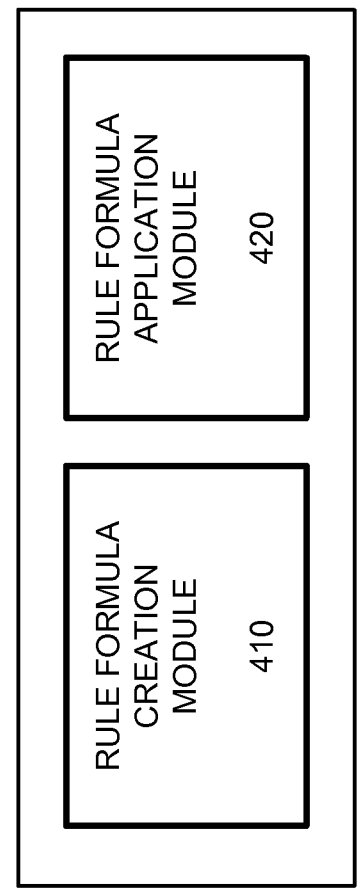
FIG. 4 is a diagram of example functional components of a rule qualification system of FIG. 2.

FIG. 4 is a diagram of example functional components of rule qualification system 240. As depicted, rule qualification system 240 may include a rule formula creation module 410 and a rule formula application module 420. Depending on the implementation, one or more of modules 410 and 420 may be implemented as a combination of hardware and software based on the components illustrated and described with respect to FIG. 3. Alternatively, modules 410 and 420 may each be implemented as hardware based on the components illustrated and described with respect to FIG. 3.

Rule formula creation module 410 may provide functionality with respect to creating rule formulae. For example, rule formula creation module 410 may enable rule qualification system 240 to receive a rule, identify rule components corresponding to the rule, create a rule formula based on the rule components, and store the rule formula for later use. As mentioned above, the rule formula may include a distilled or first-order logic version of the rule. Rule formula creation module 410 may also, or alternatively, enable rule qualification system 240 to perform other operations with respect to a rule formula, such as deleting a rule formula, removing an attribute from a rule formula, modifying an attribute of a rule formula, etc.

Rule formula application model 420 may provide functionality with respect to applying rule formulae. For example, rule formula application module 420 may enable rule qualification system 240 to receive a rule qualification request corresponding to a particular scenario (e.g., a customer calling a call center) and obtain rule application information based on the rule qualification request. Rule formula application module 420 may also, or alternatively, enable rule qualification system 240 to provide rules that are active or available (e.g., existing offers for which a customer might qualify), and determine whether the rule application information satisfies the rule formula.

In addition to the functionality described above, the functional components of rule qualification system 240 may also, or alternatively, provide functionality as described elsewhere in this description. Further, while FIG. 4 shows a particular number and arrangement of modules, in alternative implementations, rule qualification system 240 may include additional modules, fewer modules, different modules, or differently arranged modules than those depicted.

Figure 5:
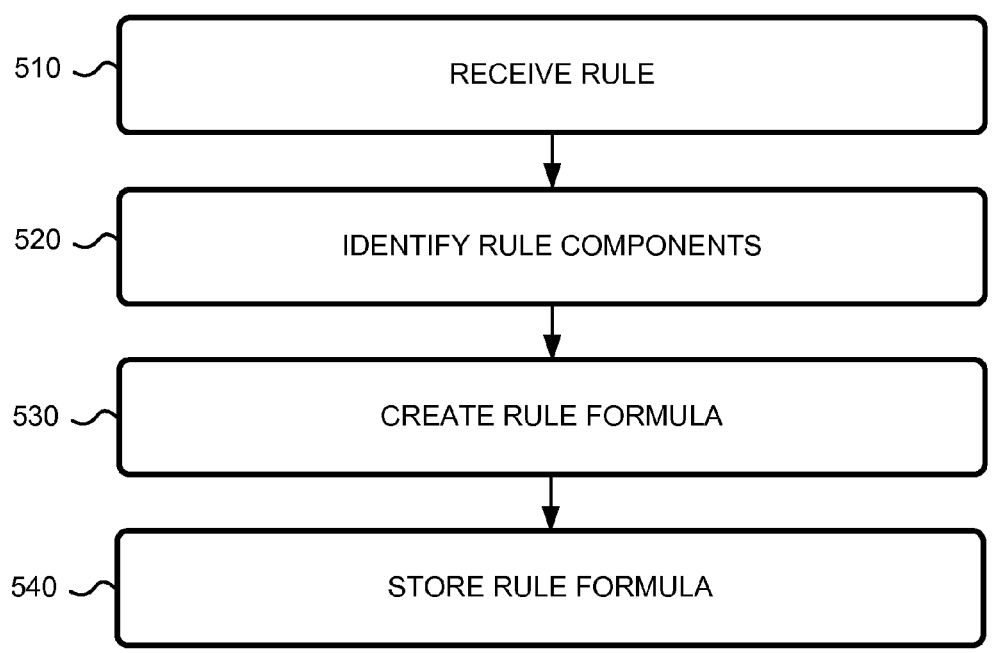
FIG. 5 is a flow chart of an example process for creating a rule according to an implementation described herein.

FIG. 5 is a flow chart of an example process 500 for creating a rule formula according to one or more implementations described herein. In some implementations, process 500 may be performed by one or more components of rule qualification system 240. In other implementations, some or all of process 500 may be performed by one or more other components/devices, or a group of components/devices, including or excluding rule qualification system 240. A description of FIG. 5 is provided below with references to FIGS. 6A-6AC.

As shown in FIG. 5, process 500 may include receiving a rule (block 510). For example, rule qualification system 240 may receive a rule. In some implementations, rule qualification system 240 may receive the rule from a user or a system operator via communication interface 360. Additionally, or alternatively, rule qualification system 240 may receive the rule from another device via input device 340. The rule may include one or more conditions or requirements corresponding to a consequence or result.

For instance, an example rule 610 is provided in FIG. 6A. As depicted, rule 610 may state that a customer qualifies for offer A0001 if the customer is a California customer (e.g., lives in California (CA)), has Fiber-to-the-Premise (FTTP) voice service, and has a total line count of at least two. Rule 610 may also state that a customer qualifies for offer A0001 if the customer is a New York customer (e.g., lives in New York (NY)), has a FTTP voice service, and has a FIOS data service.

Returning to FIG. 5, process 500 may include identifying rule components (block 520). For instance, rule qualification system 240 may identify rule components corresponding to a rule. In some implementations, rule qualification system 240 may identify the rule components based on one or more inputs from the system operator. For example, rule qualification system 240 may provide the system operator with a graphical user interface (GUI) for inputting a rule, identifying rule components corresponding to the rule, and/or identifying a rule component type (e.g., a constant, a variable, a function, a predicate, etc.) corresponding to each rule component. Additionally, or alternatively, rule qualification system 240 may identify the rule components based on one or more automated operations or processes executed by rule qualification system 240. For example, rule qualification system 240 may analyze a rule received from the system operator, identify rule components, and/or specify a rule component type corresponding to each rule component.

For instance, FIG. 6B provides examples of rule components 620 corresponding to rule 610. Rule components 620 may include constants, variables, functions, and predicates. As depicted in FIG. 6B, the constant "A0001" may correspond to or otherwise represent an offer code, the constant "CA" may represent California, and the constant "NY" may represent New York. The variable "x" may represent a particular customer, and the variable "w" may represent a particular offer. The function "state(x)" may represent a state of customer x, and the function "vlinencnt(x)" may represent a voice line count of customer x. The predicate "FTTP(x)" may represent that customer x has FTTP voice service, the predicate "FDATA(x)" may represent that customer x has FiOS data service, and the predicate "QUALIFY(x,w)" may represent that customer x is qualified for offer w.

Returning to FIG. 5, process 500 may include creating a rule formula (block 530). For example, rule qualification system 240 may create a rule formula based on rule components (e.g., rule components 620). In some implementations, rule qualification system 240 may create the formula based on one or more inputs from the system operator. Additionally, or alternatively, rule qualification system 240 may create the rule formula based on one or more automated functions, operations, or processes executed by rule qualification system 240.

In some implementations, rule qualification system 240 may create multiple formulae from rule components corresponding to the same rule. For instance, if an offer includes multiple sets of exclusive rule conditions, rule qualification system 240 may create a different rule formula for each set of rule conditions. Additionally, or alternatively, rule qualification system 240 may consolidate the rule formula by, for example, converting one type of rule component into another type of rule component (e.g., by replacing a predicate with a variable produced by a function). In some implementations, rule qualification system 240 may represent the formula as a database record that includes one or more attributes.

Figure 6C:
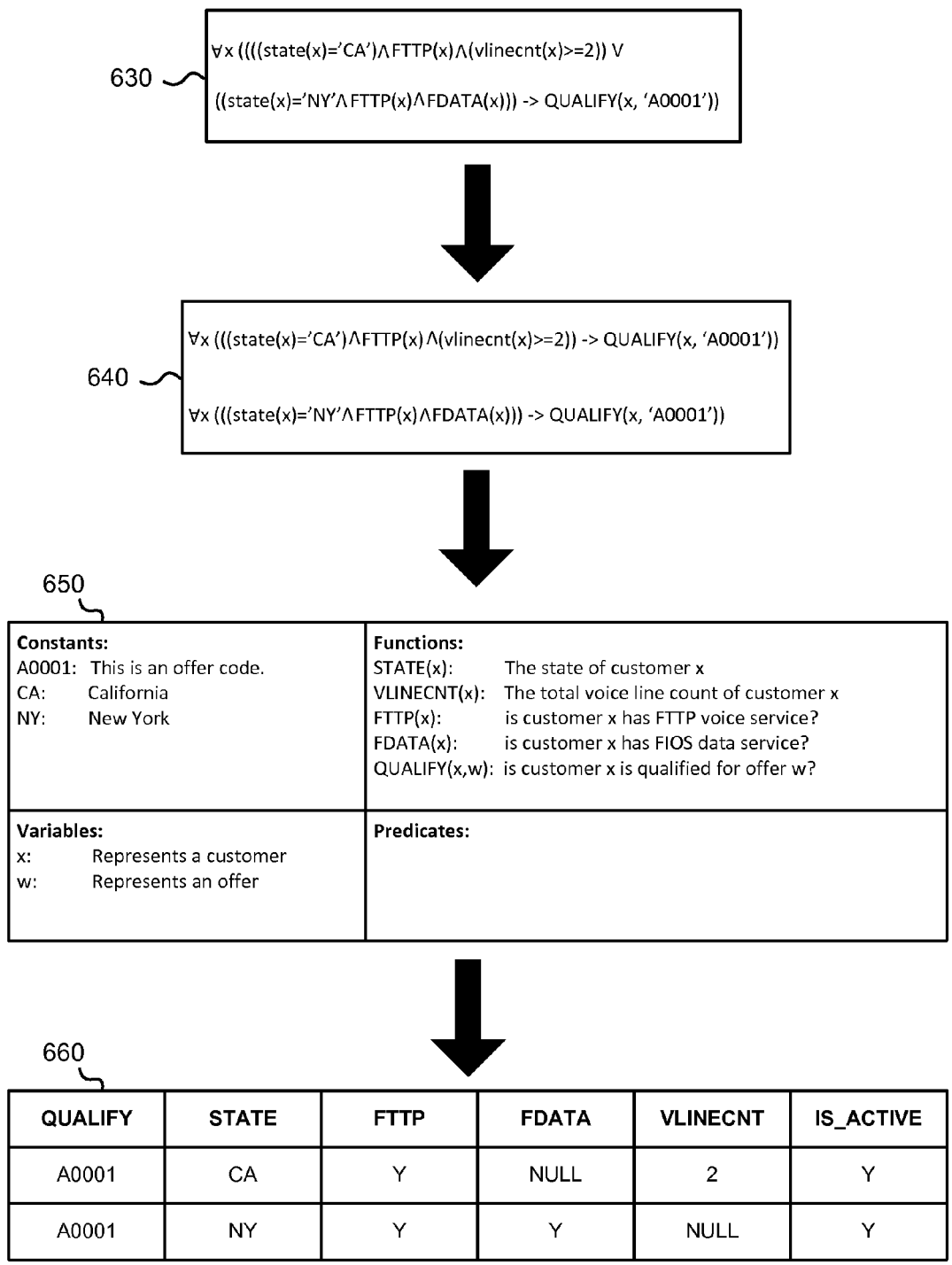

For instance, FIG. 6C provides an example formula 630 corresponding to rule components 620. Formula 630 may include two sets of rule conditions indicted by the operator "V" which may indicate an OR relationship. As such, formula 630 may be divided or otherwise converted into formulae 640.

Additionally, as illustrated by a comparison of offer components 620 and offer components 650, each formula of formulae 640 may be further consolidated by, for example, converting predicates "FTTP(x)," "FDATA(x)," and "QUALIFY (x,w)" into function variables "FTTP(x)," "FDATA(x)," and "QUALIFY (x,w)." Further, as represented by data structure 660, rule 610 may be further consolidated by creating database records (or one or more other types of data structures) based on offer components 650. As such, one or more implementations, described herein, may provide solutions for converting a relatively complex data structure, as represented by rule 610, to a data structure that is germane to efficient application within a computing environment.

Returning now to FIG. 5, process 500 may include storing the rule formula (block 540). For example, rule qualification system 240 may store the rule formula. In some implementations, rule qualification system 240 may store the rule formula locally. Additionally, or alternatively, rule qualification system 240 may store the rule formula remotely. The rule formula may be stored for later use, such as for determining whether one or more sets of information satisfy the conditions of the rule.

While FIG. 5 shows a flow chart of an example process 500 for creating a rule formula, in other implementations, a process for creating a rule formula may include fewer operations, different operations, differently arranged operations, or additional operations than depicted in FIG. 5.

Figure 7:
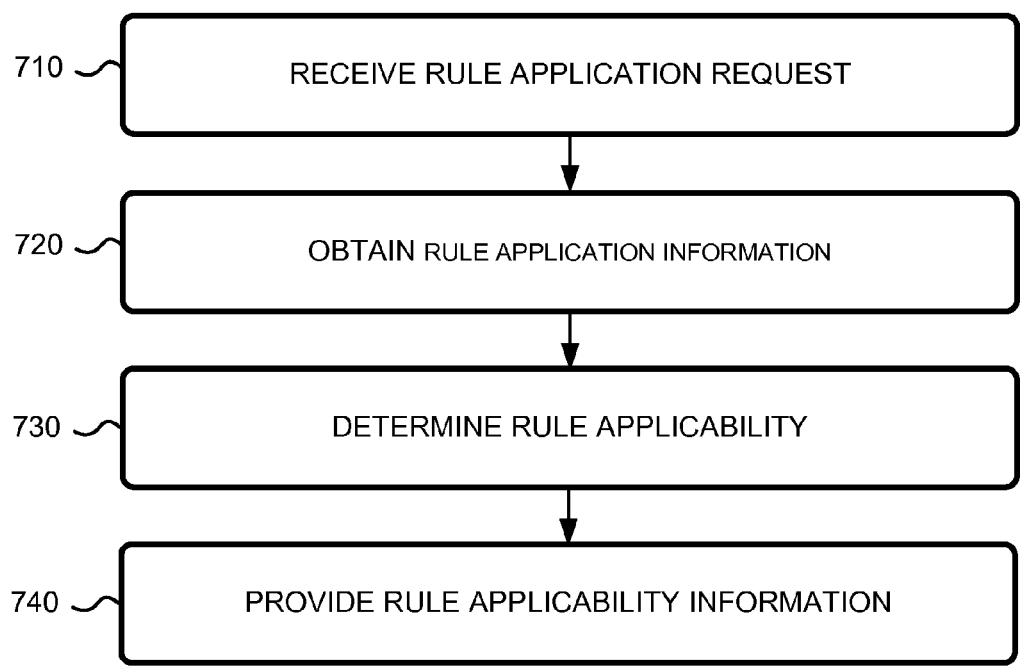
FIG. 7 is a flow chart of an example process for applying a rule according to an implementation described herein.

FIG. 7 is a flow chart of an example process 700 for applying a rule formula according to one or more implementations described herein. In some implementations, process 700 may be performed by one or more components of rule qualification system 240. In other implementations, some or all of process 700 may be performed by one or more other components/devices, or a group of components/devices, including or excluding rule qualification system 240.

As shown in FIG. 7, process 700 may include receiving a rule application request (block 710). For example, rule qualification system 240 may receive a rule application request. In some implementations, rule qualification system 240 may receive the rule application request from a call center agent corresponding to call center 230. A rule application request may include a variety of one or more types of information, such as information corresponding to an individual (e.g., a customer identifier corresponding to an individual contacting call center 230), information corresponding to an account (e.g., an account identifier corresponding to an individual contacting call center 230), a digital profile (e.g., a profile identifier corresponding to an individual contacting call center 230), or another type of information that may be used to determine the availability of a rule (e.g., an offer for goods or services) and/or used to obtain additional information (e.g., from customer information source 250).

As further shown in FIG. 7, process 700 may include obtaining rule application information (block 720). For example, rule qualification system 240 may obtain rule application information. Similar to the rule application request mentioned above, rule application information may include a variety of one or more types of information relating to the rule application request. For example, if the rule application request corresponds to an inquiry regarding what types of offers are available to a customer, rule application information may include information corresponding to the customer, information corresponding to a customer account, information corresponding to a digital profile, or another type of information that may be relevant to the rule application request. In some implementations, the qualification request may include some type of information, such as a customer identifier, an account identifier, etc., that rule qualification system 240 may use to obtain the rule application information.

As mentioned above, the rule application information may be obtained by rule qualification system 240 from one or more of a variety of rule application information sources (see, for example, FIG. 1). For instance, where the rule application request corresponds to a system user inquiring about which offers that may be available to a particular customer, rule qualification system 240 may obtain active offer information from an offer information server, active service information from a service information server, active product information from a products information server, order information from an order information server, customer profile information from a customer profiles server, offer history information from a customer retention server, etc. In some implementations, rule qualification system 240 may access one or more reference tables to determine which types of information should be obtained, which may enable rule qualification system 240 to identify sources of such information and/or enable rule qualification system 240 to communicate with the identified sources.

Returning to FIG. 7, process 700 may include determining a rule applicability (block 730). For example, rule qualification system 240 may determine whether the rule application information satisfies the rule formula. In some implementations, rule qualification system 240 may make such a determination based on, for example, a comparison or other type of analysis of the rule application information and the rule formula. For instance, rule qualification system 240 may compare the rule application information to the rule formula to determine whether each rule component is satisfied by the rule application information. Alternatively, or additionally, the rule application information and the rule formula may include similar data structures (e.g., relational database tables), which may, for example, expedite the process of determining whether the rule at issue is satisfied.

As further shown in FIG. 7, process 700 may include providing rule applicability information to a system user (block 740). For example, rule qualification system 240 may provide rule applicability information to a system user. In some implementations, rule qualification system 240 may provide the rules that are satisfied by the rule application information. In other implementations, rule qualification system 240 may indicate the rules that are not satisfied by the rule application information. Alternatively, or additionally, rule qualification system 240 may indicate the rules that are satisfied by the rule application information and the rules that are not satisfied by the rule application information. Alternatively, or additionally, rule qualification system 240 may provide additional information as well, such as information corresponding to an individual, information corresponding to an account, or any other type of information that my be relevant to applying the rule application information to the rule formula.

While FIG. 7 shows a flow chart of example process 700 for applying a rule formula, in other implementations, a process for applying a rule formula may include fewer operations, different operations, differently arranged operations, or additional operations than depicted in FIG. 7.

Figure 8:
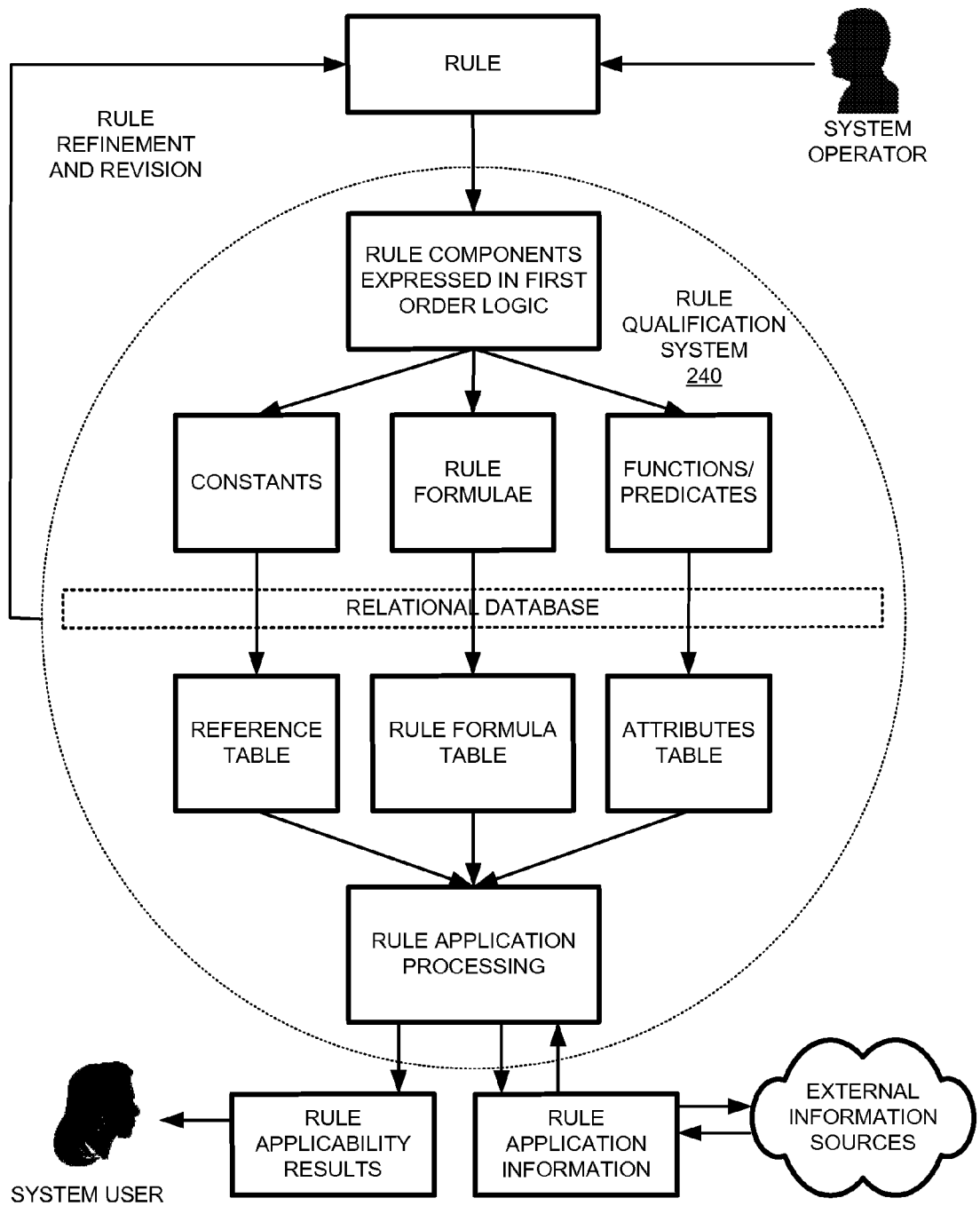
FIG. 8 is a diagram of example operations for creating and applying a rule according to an implementation described herein.

FIG. 8 is a diagram of example operations for creating and applying a rule according to an implementation described herein. A system operator may provide a rule to rule qualification system 240, and rule qualification system 240 may express rule components, corresponding to the rule, using first-order logic. Based on the rule components, rule qualification system 240 may identify constants (e.g., static attributes or values) corresponding to the rule, may develop a rule formula corresponding to the rule, and may define functions and/or predicates corresponding to the rule.

Rule application system 240 may use the constants to create a reference table (e.g., a database table that stores static characteristics or other types of information corresponding to the rule). Rule application system 240 may use the rule formula to create a rule formula table, such as rule formula 660 discussed above with reference to FIG. 6. Additionally, or alternatively, rule application system 240 may use the functions and/or predicates to create an attributes table (e.g., a database table that stores information corresponding to rule attributes in the rule formula table).

Rule qualification system 240 may utilize the reference table, the rule formula table, and/or the attributes table when engaging in rule application processing. Rule application system 240 may also, or alternatively, obtain rule application information from one or more external information sources. In some implementations, information stored in the reference table, the rule formula table, and/or the attribute table may enable rule application system 240 to obtain the rule application information from the external information sources. Additionally, or alternatively, rule qualification system 240 may organize and/or format the rule application information in a manner that is consistent with the reference table, the rule formula table, and/or the attributes table, which may facilitate the process of applying or comparing the rule application information to the rule formula. Rule qualification system 240 may also, or alternatively, provide the results of the rule application processing (e.g., rule applicability results) to a system user.

FIG. 9 is a diagram of data structures 910-930 according to an implementation described herein. Each of data structures 910-930 may include a table in a relational database or another type of data structure corresponding to a relational database or another type of data storage system. In some implementations, one or more of data structure 910-930 may be created and/or managed by rule qualification system 240. In other implementations, one or more of data structures 910-930 may be created and/or maintained by another device other than rule qualification system 240.

Data structure 910 may include a rule formula table that includes a set of records corresponding to one or more rules. As depicted, data structure 910 may include certain characteristics (e.g., STATE values, FTTP values, FDATA values, etc.) that may be similar to data structure 660 of FIG. 6. However, unlike data structure 660, data structure 910 may include additional database records and attribute values corresponding to rules other than rule 610. In particular, data structure 910 may include records corresponding to rules represented by the record corresponding to QUALIFY value "A0002" and QUALIFY value "A0003." Accordingly, implementations, described herein, may enable distinct rules to be processed, stored, and/or formatted in accordance with a standardized format (e.g., a relational database table).

Data structure 920 may include an attribute table with a set of records corresponding to one or more attribute types (e.g., columns) in data structure 910. For instance, data structure 920 may include a record corresponding to the attribute type "QUALIFY," which is a column heading in data structure 910. As depicted in FIG. 9, each record of data structure 920 may include a FUNCTION_ID attribute that may identify an actual software function that may be executed by rule application system 240 to, for example, identify a system or device (e.g., customer information system 250) storing information that is relevant to a rule application request, a rule formula, and/or a corresponding attribute type. As such, rule application system 240 may be capable of using data structure 910 to identify active rules and attribute types that are relevant to the active rules. Rule application system 240 may also, or alternatively, use data structure 920 to execute software functions to obtain information that is relevant to a rule application request and/or a rule that is currently active.

Data structure 930 may include a reference table for a rule formula table. For instance, as depicted in FIG. 9, data structure 930 may include additional information (e.g., a description, a product identifier, a start date, an end date, etc.) corresponding to offer "A0001" and offer "A0002." The information contained in reference tables or similar data structures may be required or otherwise helpful to define or describe the form, function, or other characteristics of a rule.

One or more of the implementations, described herein, may provide solutions for creating a rule and applying the rule to a given scenario in an efficient, scalable, and adaptable manner. For instance, distilling a rule into a rule formula may enable rule qualification system 240 to operate with a high degree of efficiency with respect to determining whether set of information (e.g., rule application information) satisfies the rule. Additionally, expressing a rule as a record in a database table may enable the rule to be readily modified, added to, disabled, etc. Further, since the rule may be expressed using first-order logic, relational database tables, etc., the processes and operations of rule qualification system 240 may be readily capable of scaling.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 5 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a computing device, a rule comprising information describing conditions associated with a consequence;
   identifying, by the computing device, rule components corresponding to the rule, where each of the rule components corresponds to a portion of the rule;
   creating, by the computing device, a rule formula based on the rule components, where creating the rule formula comprises:
   creating a first-order logic version of the rule, and creating a rule formula table based on the first-order logic version of the rule;
storing, by the computing device, the rule formula in a relational database;
creating a reference table comprising support information corresponding to the rule, wherein the support information comprises rule title information and rule description information; and
associating the rule formula table with the reference table.

2. The method of claim 1, where creating the first-order logic version of the rule comprises:
analyzing each of the rule components within the context of the rule to characterize each of the rule components as at least one of:
a constant data type;
a variable data type;
a function data type; or
a predicate data type.

3. The method of claim 1, where:
the rule comprises a plurality of condition sets that satisfy the rule, and
creating the rule formula based on the rule components further comprises:
identifying each condition set of the plurality of condition sets, and
representing each condition set of the plurality of condition sets as a different rule formula.

4. The method of claim 1, further comprising:
creating an attributes table comprising function information and predicate information corresponding to the rule, where the attributes table comprises identifiers corresponding to software instructions to provide information corresponding to the rule; and
associating the attributes table with the rule formula table.

5. The method of claim 1, where:
the rule formula table includes an availability attribute indicating whether the rule is available for application, and
the method further comprises:
verifying that the rule is currently available for application based on the availability attribute corresponding to the rule.

6. The method of claim 1, further comprising:
receiving a rule application request that includes a request to apply the rule to rule application information associated with the rule application request;
obtaining the rule application information based on the rule application request;
determining whether the rule application information satisfies the rule formula; and
providing a result indicating whether the rule application information satisfies the rule formula.

7. The method of claim 1, wherein creating the rule formula based on the rule components includes:
creating multiple rule formulae for the rule based on the rule components.

8. A computing device, comprising:
a memory comprising instructions; and
a processor to execute the instructions in the memory to:
receive a rule comprising information describing conditions associated with a consequence;
identify rule components corresponding to the rule, where each of the rule components corresponds to a portion of the rule;
determine a data type corresponding to each of the rule components;
create a rule formula table based on the rule components and the data type corresponding to each of the rule components;
add a rule availability attribute to the rule formula table, wherein the rule availability attribute indicates whether the rule is currently available for application;
receive a rule application request comprising a request to apply the rule to rule application information associated with the rule application request;
obtain the rule application information based on the rule application request;
determine whether the rule application information satisfies a rule formula; and
provide a result indicating whether the rule application information satisfies the rule formula.

9. The computing device of claim 8, where, when determining the data type corresponding to each of the rule components comprises, the processor is further to:
characterize each of the rule components as at least one of:
a constant data type;
a variable data type;
a function data type; or
a predicate data type.

10. The computing device of claim 8, where:
the rule comprises a plurality of condition sets that satisfy the rule, and
and the processor is further to:
identify each condition set of the plurality of condition sets, and
represent each condition set of the plurality of condition sets as a different record in the rule formula table.

11. The computing device of claim 8, where the processor is further to:
create a reference table comprising support information corresponding to the rule, where the support information comprises rule description information; and
associate the rule formula table with the reference table.

12. The computing device of claim 8, where the processor is further to:
create an attributes table comprising function information and predicate information corresponding to the rule, where the attributes table comprises identifiers corresponding to software instructions that provide information corresponding to the rule; and
associate the attributes table with the rule formula table.

13. The computing device of claim 8, where the processor is further to:
receive a rule application request that includes a request to apply the rule to rule application information associated with the rule application request;
obtain the rule application information based on the rule application request;
determine whether the rule application information satisfies the rule formula; and
provide a result indicating whether the rule application information satisfies the rule formula.

14. The computing device of claim 8, wherein the rule application information includes information corresponding to a customer or information corresponding to an account of the customer.

15. One or more non-transitory computer-readable media, comprising:
one or more instructions that, when executed by a processor, cause the processor to:
receive a rule comprising information describing conditions associated with a consequence;
create a rule formula table based on the rule;

receive a rule application request that includes a request to apply the rule to rule application information associated with the rule application request;
determine a current storage location corresponding to the rule application information;
obtain the rule application information based on the rule application request;
determine whether the rule application information satisfies a rule formula; and
provide a result indicating whether the rule application information satisfies the rule formula.

16. The computer-readable media of claim 15, wherein the rule application information includes information corresponding to a customer or information corresponding to an account of the customer.

17. The computer-readable media of claim 15, further comprising:
one or more instructions that, when executed by the processor, cause the processor to:
identify rule components corresponding to the rule, where each of the rule components corresponds to a portion of the rule; and
determine a data type corresponding to each of the rule components.

18. The computer-readable media of claim 15, where:
the rule comprises a plurality of condition sets that satisfy the rule, and
the computer-readable media further comprises:
one or more instructions that, when executed by the processor, cause the processor to:
identify each condition set of the plurality of condition sets; and
represent each condition set of the plurality of condition sets as a different record in the rule formula table.

19. The computer-readable media of claim 15, further comprising:
one or more instructions that, when executed by the processor, cause the processor to:
create a reference table comprising support information corresponding to the rule, where the support information comprises rule description information; and
associate the rule formula table with the reference table.

20. The computer-readable media of claim 15, further comprising:
one or more instructions that, when executed by the processor, cause the processor to:
create an attributes table comprising function information and predicate information corresponding to the rule, where the attributes table comprises identifiers corresponding to software instructions to provide information corresponding to the rule; and
associate the attributes table with the rule formula table.

* * * * *